(12) United States Patent
Matsuo et al.

(10) Patent No.: US 8,324,851 B2
(45) Date of Patent: Dec. 4, 2012

(54) METHOD FOR DETERMINING A ROTOR POSITION IN A PERMANENT MAGNET MOTOR

(75) Inventors: Takayoshi Matsuo, Brown Deer, WI (US); Thomas J. Rehm, Mequon, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 491 days.

(21) Appl. No.: 12/397,413

(22) Filed: Mar. 4, 2009

(65) Prior Publication Data

US 2010/0225262 A1 Sep. 9, 2010

(51) Int. Cl.
*H02P 1/04* (2006.01)

(52) U.S. Cl. ......... 318/400.33; 318/400.34; 318/400.35; 318/400.38; 318/799; 318/809

(58) Field of Classification Search ........... 318/400.33–400.35, 400.38, 799, 318/809

See application file for complete search history.

(56) References Cited

U.S. PATENT DOCUMENTS

| 6,172,498 | B1 | 1/2001 | Schmidt et al. |
| 6,897,591 | B2 * | 5/2005 | Peachee et al. ............ 310/166 |
| 7,233,123 | B2 * | 6/2007 | Koczara et al. .......... 318/400.01 |
| 7,486,041 | B2 * | 2/2009 | Wasson et al. ............... 318/434 |

* cited by examiner

*Primary Examiner* — Walter Benson
*Assistant Examiner* — Erick Glass
(74) *Attorney, Agent, or Firm* — Quarles & Brady LLP (57) ABSTRACT

A method for determining the position of a rotor in a permanent magnet synchronous motor includes applying voltage pulses to the windings at successive electrical angles while the motor is at a standstill. The resultant current is sampled. The position of a maximum current is determined by identifying an segment of an electrical cycles which includes the maximum current, and using a spline interpolation to model the current flow in this segment. The maximum current is then correlated to the position of the rotor.

24 Claims, 9 Drawing Sheets

METHOD FOR DETERMINING A ROTOR POSITION IN A PERMANENT MAGNET MOTOR

BACKGROUND OF THE INVENTION

The present invention relates to permanent magnet synchronous machines and more particularly to a method and apparatus for determining the position of a motor rotor.

To assure maximum torque per amp output in a permanent magnet synchronous motor, the control must know the rotor position or angle with respect to the stator. The torque constant is proportional to the cosine of electrical angle misalignment, and an offset of only 10 degrees translates to about 1.5 percent reduction in maximum torque per amp.

In prior art devices, high accuracy absolute feedback devices have been used. These devices are pre-aligned, and store an offset angle to the magnetic axis for the drive to read at power-up. Other types of permanent magnet synchronous motors include devices such as resolvers that are physically aligned and clamped, usually with the aid of a custom test fixture supplied by the drive manufacturer. While these integrated motor/feedback methods are commonly used in motors for controlling motion, they are not used with standard or general purpose drives because in these applications, the motor and feedback are treated separately. Even absolute devices used in standard drives must therefore undergo initial alignment to determine offset angle.

Other types of encoder devices can also be used. In particular, incremental encoders are used to provide relatively inexpensive rotor feedback. These devices, however, lack absolute position and also must be re-aligned whenever power is interrupted.

Therefore, while a number of methods are known for determining the rotor position in a permanent magnet synchronous motor, these devices all add significant cost to the device. It is becoming increasingly important, however, to reduce the cost of permanent magnet synchronous motors. The following outlines a method for determining the rotor position that is inexpensive, simple, accurate and relatively maintenance free.

SUMMARY OF THE INVENTION

The technique proposed determines rotor position based on the non-linear characteristics of iron with applied flux, and enables drive systems with permanent magnet motors to utilize less expensive incremental encoder in place of absolute position sensors.

The back-iron of a motor exhibits a non-linear inductance as seen by the stator. The inductance depends on the level of flux and rotor angle, and the lowest inductance occurs when the rotor and stator axis are in alignment. To evaluate the inductance, equally spaced voltage pulses of known angle and amplitude are applied to the stator that result in an equivalent number of measurements of peak current acquired while the motor is at standstill. The electrical angle segments are evaluated to determine which segment includes the maximum current spike. A spline is then applied to this segment, and the position of current maximum is found by evaluating the spline with a peak detector to seek the maximum value. This value provides an indication of the position of the rotor. In a non-limiting example, for a three phase motor, six voltage pulses can be applied, and six measurements of peak current acquired. These measurements can be evaluated using a seventh order spline.

In one embodiment of the invention, a method for determining the absolute position of a rotor in a permanent magnet synchronous motor (PMSM) motor having a rotor which includes at least one north pole, at least one south pole, and a stator having windings arranged about a core is provided. Each winding is arranged such that when a current passes through the winding, the current generates flux in the core. A short duration voltage pulse is applied to the stator windings at each of a plurality of successively spaced electrical angle sample points, and the current is sampled at the end of each voltage pulse. An electrical angle segment between a first and a second successive electrical angle sample point is identified that includes a maximum current. The magnitude of the current is evaluated in the identified electrical angle segment to locate the peak current. The angle of the peak current is determined, and correlates to a rotor position.

In another aspect of the invention the electrical angle sample points are spaced at intervals through an electrical cycle. A magnitude of the current is evaluated at each of the electrical angle sample points, identifying the electrical angle sample point that has the greatest magnitude of current. The slope of the current between the identified electrical angle sample point and the adjacent electrical angle sample points is determined to determine a direction that the slope is rising. The maximum current is identified by interpolating between the electrical angle sample point having the maximum motor current and the adjacent electrical angle sample point in the direction of rising slope.

In another aspect of the invention, a current slope is calculated between two adjacent electrical angle sample points. A magnitude of the current at successive electrical angle sample points is determined, and the magnitude of the current at one of the successive electrical angle sample points is subtracted from the magnitude of the current at the other of the successive electrical angle sample points. The result is divided by the difference in electrical angle between the successive electrical angle sample points, providing a slope. The slope can be used to locate the peak current.

In another aspect of the invention, a spline interpolation of the identified electrical angle segment is performed. A magnitude, a slope, an acceleration and a jerk associated with the current at the first and second electrical angle in the electrical angle segment for use as boundary values in the spline interpolation. In one embodiment, the spline is a seventh order spline.

A maximum sampled motor current can be identified from the sampled motor currents at the electrical angle sample points, and a direction of the slope of the motor current identified at the electrical angle sample point containing the identified maximum sampled motor current. A spline function of current magnitude can be applied between the electrical angle sample point having the maximum motor current and the adjacent electrical angle sample point in the direction of rising slope.

In another aspect of the invention, a drive system is provided comprising: a PMSM motor having a rotor which includes at least one north pole, at least one south pole, and a stator having windings arranged about a core. Each winding is arranged such that when a current passes through the winding, the current generates flux in the core. An inverter including switching devices is connected to corresponding windings to apply voltage pulses to the windings, and a current sensor is associated with each of the windings to sample current. A controller applies voltage pulses to the windings. The controller is programmed to activate the switching devices to apply a short duration voltage pulse of to the stator windings at each of a plurality of successively spaced electrical angle sample points, sample a current at the end of each voltage pulse at the current sensor, identify an electrical angle segment between a first and a second successive electrical angle sample point that includes a maximum current, evaluate a magnitude of the current in the identified electrical angle segment to locate the peak current, and determine the angle of the peak current. The angle correlates to a rotor position.

The foregoing and other aspects of the invention will be described in the detailed description which follows. In the description, reference is made to the accompanying drawings which illustrate a preferred embodiment of the invention.

DETAILED DESCRIPTION OF THE INVENTION

I. Motor Configuration

Figure 1:
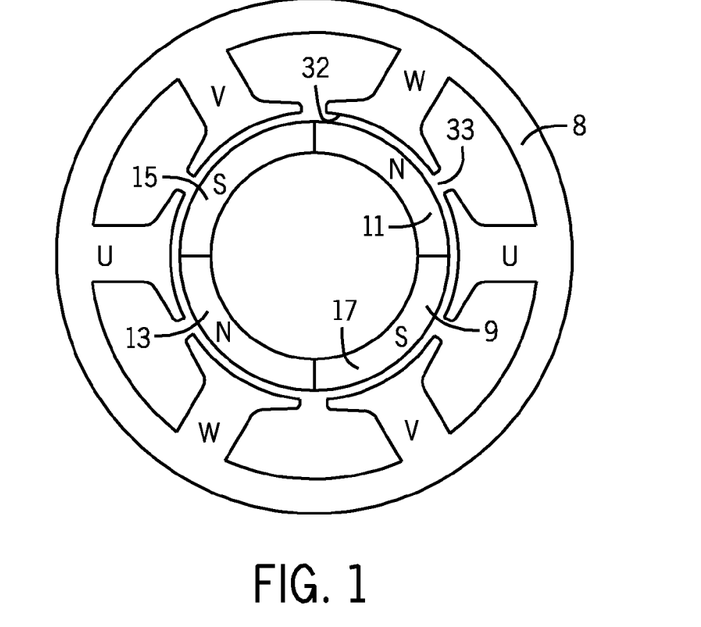
FIG. 1 is a cross-sectional view of an exemplary permanent magnet synchronous motor (PMSM)

The present invention will be described in the context of the exemplary PMSM 30 illustrated in FIG. 1. PMSM 30 includes a stator 8 and a rotor 9. Stator 8 includes an iron core and three windings U, V and W. Stator 8 forms a cylindrical cavity 33 defined by an internal surface 32.

Rotor 9 is cylindrical and is mounted for rotation within cavity 33, and includes two permanent magnets having oppositely facing north poles 11, 13 and two oppositely facing south poles 15, 17.

Figure 2:
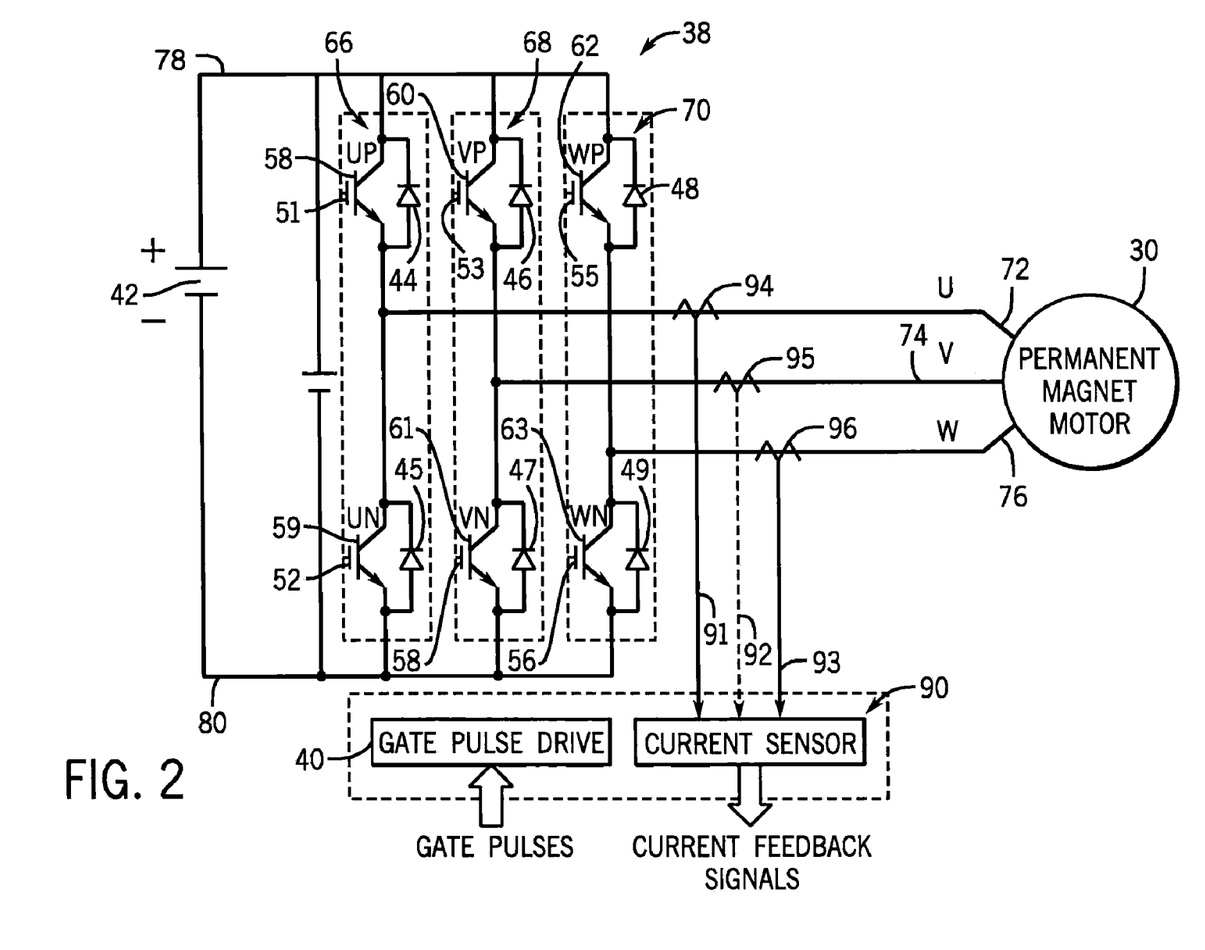
FIG. 2 a drive configuration with a three phase IGBT inverter.

Referring also to FIG. 2, a pulse width modulated (PWM) inverter 38 is illustrated which is linked to PMSM 30 for providing currents to windings U, V, and W. One end of winding U is connected to the inverter and the other end is connected to the corresponding ends of phases V and W. In addition to being linked to PMSM 30, inverter 38 is shown connected to a signal generator 40 and a DC voltage source 42. Generator 40 is in turn linked to a controller 90.

Inverter 38 consists of six solid state switching devices 58, 59, 60, 61, 62 and 63 arranged in series pairs. These devices can be, as shown, IGBT's, BJT's GTO's or other transistor technology devices. Each device 58, 59, 60, 61, 62 and 63 is coupled with an inverse parallel connected diode 44, 45, 46, 47, 48 and 49, respectively. Each series arranged pair of switching devices 58 and 59, 60 and 61, and 62 and 63, make up a separate leg 66, 68 and 70 of inverter 38 and have a common node which is electrically connected to a unique motor terminal 72, 74 and 76 (and thus to a unique stator winding U, V, or W). Each switching device 58 through 63 is also electrically connected by a firing line 51-56 to generator 40.

Source 42 is a DC voltage source with a high voltage rail 78 and a low voltage rail 80 and each leg 66, 68 and 70 connects high voltage rail 78 to low voltage rail 80.

In operation, with respect to leg 66, generator 40 operates to turn devices 58 and 59 on and off in a repetitive sequence that alternately connects the high and low voltage rails 78 and 80 to, and produces a series of high frequency voltage pulses at terminal 72. Similarly, generator 40 operates to turn devices 60 and 61 on and off in a repetitive sequence that alternately connects the high and low voltage rails 78 and 80 to, and produces a series of high frequency voltage pulses at, terminal 74 and operates to turn devices 62 and 63 on and off in a repetitive sequence that alternately connects the high and low voltage rails 78 and 80 to, and produces a series of high frequency voltage pulses at, terminal 76.

By controlling the current pulses provided to terminals 72, 74 and 76 electromagnetic fields within the stator cavity 33 are controlled such that the fields can be caused to rotate about cavity 33. As the stator fields rotate, the fields attract rotor north poles 11 and 13 and south poles 15 and 17 thereby causing rotor 9 to rotate within cavity 33.

Controller 90 provides command signals to generator 40 to drive PMSM 30 in a desired fashion. Controller 90 is linked via lines 91, 92 and 93 to current sensors 94, 95 and 96 (e.g. Hall effect sensors) which are, in turn, linked to feedlines for windings U, V and W. Sensors 94, 95 and 96 provide current feedback signals to controller 90.

II. Description of Volt-Sec Pulse

Referring again to FIG. 2, a typical drive configuration with a three phase IGBT inverter with current sensors is shown. The technique disclosed herein determines rotor position based on the non-linear characteristics of the iron core of the stator with applied flux. The iron core exhibits a non-linear inductance that depends upon the level of flux and rotor angle. The lowest inductance occurs when the rotor axis and the stator axis are in alignment.

While the motor is at standstill, equally spaced voltage pulses of known angle and amplitude are applied to the stator to provide an equivalent number of measurements of peak current. In a three phase motor as shown, six voltage pulses are applied, and six current measurements are taken. A 7th order spline can then be applied to a segment known to have the greatest current magnitude, and the position of the current maximum is found by evaluating the spline with a peak detector to seek the maximum value. The maximum value indicates the position of the rotor.

Figure 3:
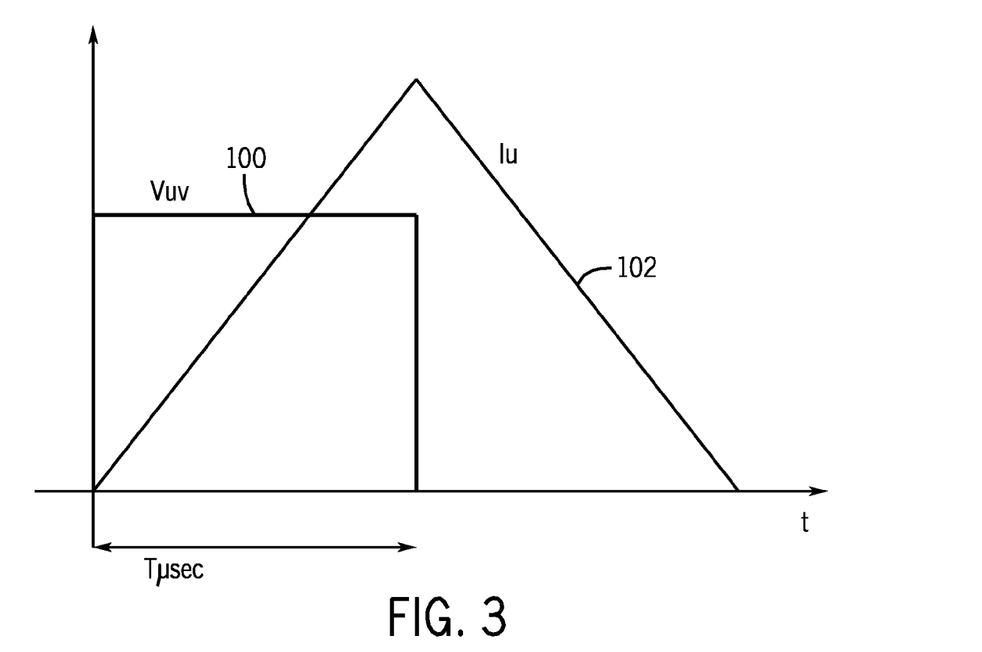
FIG. 3 is an illustration of a volt-sec pulse and motor phase current.
Figure 4A:
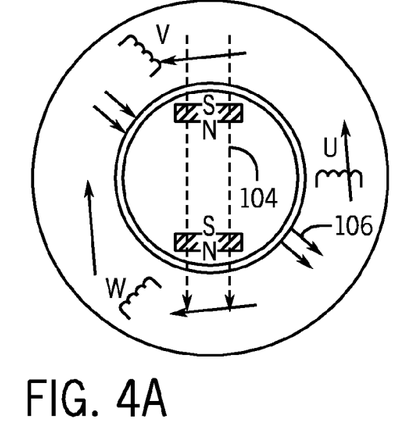
FIG. 4 is an illustration of six cases of flux vectors which are produced when a volt-sec pulse is applied to two stator windings.
Figure 4B:
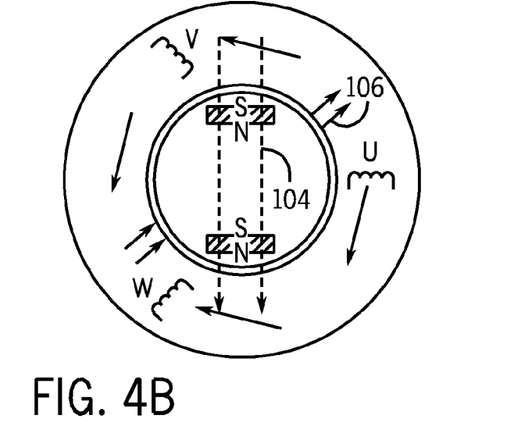
Figure 4C:
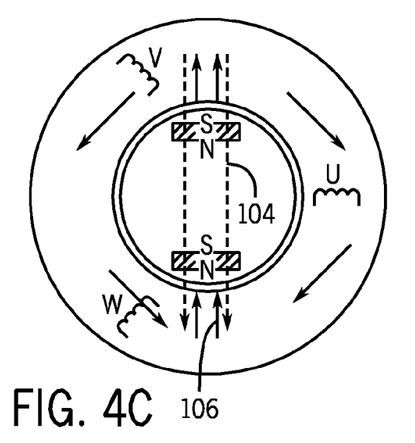
Figure 4D:
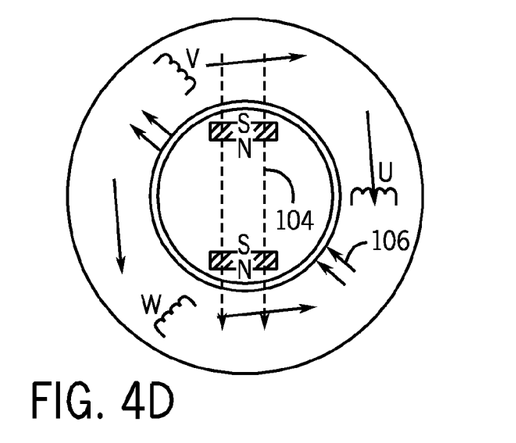
Figure 4E:
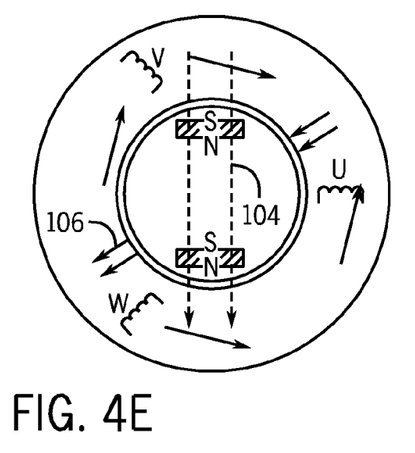
Figure 4F:
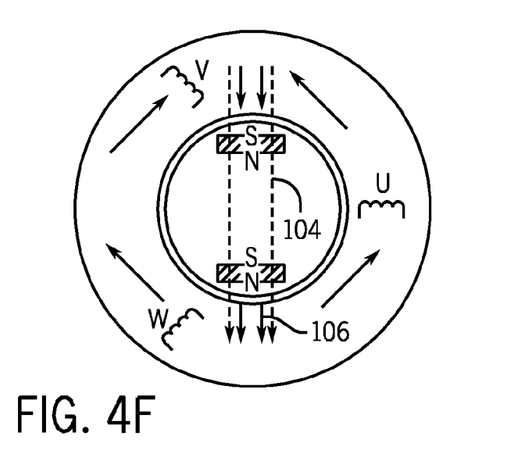

Referring again to FIG. 2 and also to FIG. 3, while the motor 30 is at a standstill, a volt-sec pulse 100 is applied to successively pulse the gates of pairs of the switching devices as shown in FIG. 3, which illustrates the pulse 100 applied between the permanent magnet motor terminals U-V and the phase U motor current 102 when gate pulses are provided to the IGBTs UP 58 and VN 61 for T μsec.

After the volt-sec pulse is applied, the motor phase current is sampled just before the end of the volt-sec pulse and is stored for the data processing. Six equally spaced volt-sec pulses are applied to the switching devices, here shown as the gates of IGBT combinations UP-VN (58-61), UP-WN (58-63), VP-UN (60-59), VP-WN (60-63), WP-UN (62-59), and WP-VN (62-61). Motor current data are collected for each volt-sec pulse, providing six current values for determining the position of the rotor 9.

When volt-sec pulses are applied to the windings at motor stator 8 as described above, flux vectors U, V, and W are produced as shown in FIGS. 4A-F, which also illustrates the permanent magnet flux 104 within the motor 30. The flux produced by the permanent magnet in the rotor causes local iron saturation within the stator 8 and changes the inductance distributions. Referring again to FIGS. 4A-4F, with the particular rotor position shown, the lowest inductance occurs in FIG. 4F, where the flux vectors are in alignment with the permanent magnet flux. In this case a volt-sec pulse 100 (FIG. 3) is applied to the windings of stator 8 by providing gate pulses to IGBTs WP-VN, as described above.

Figure 5:
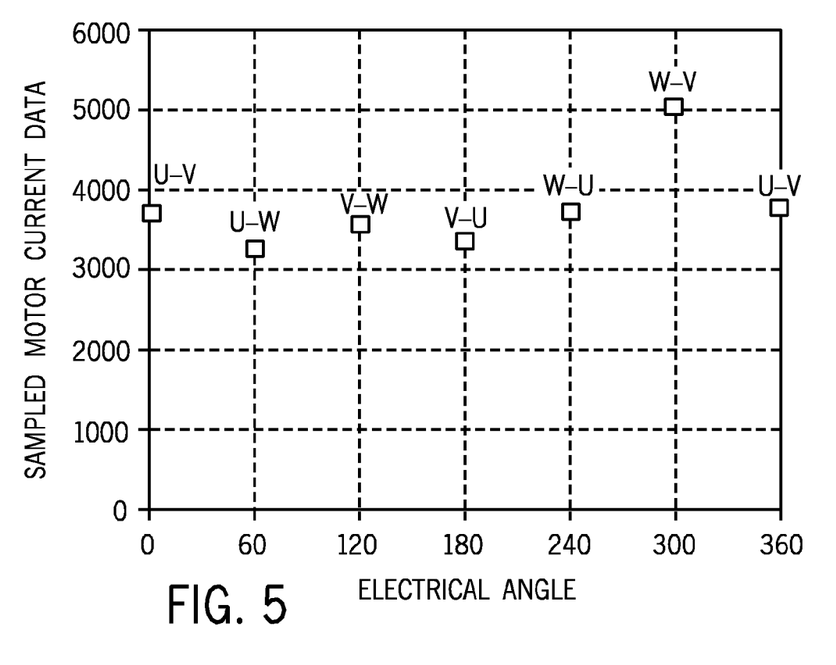
FIG. 5 is a motor phase current measurement result for the rotor position illustrated in FIG. 4.
Figure 6:
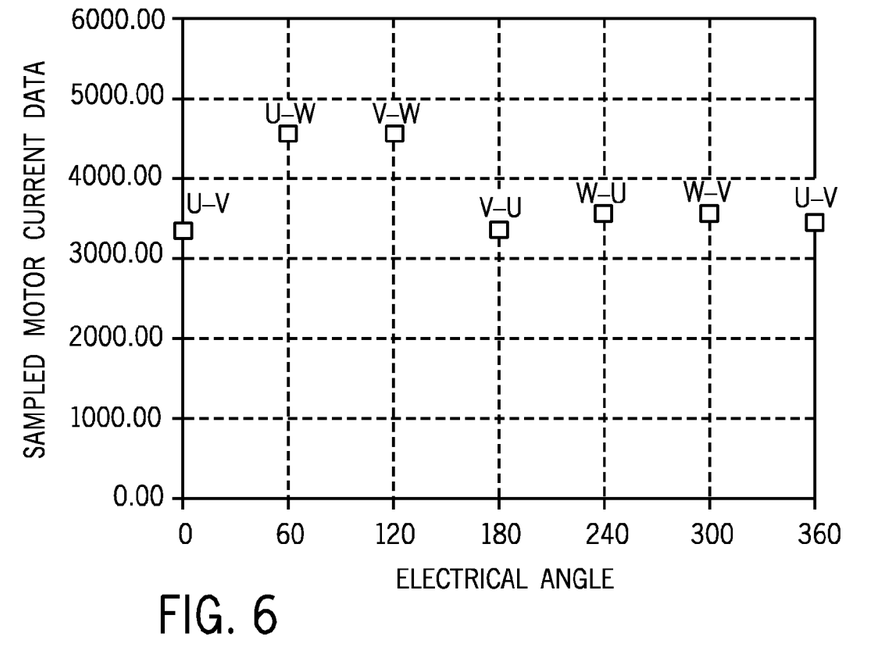
FIG. 6 is a motor phase current measurement result for the rotor position 150 degrees rotated from the position illustrated in FIG. 4.

Referring now to FIG. 5, an actual motor phase current measurement is acquired through sensors 94, 95, 96 (FIG. 2) and the result is shown for the position of rotor 9 as illustrated in FIGS. 4A-4F. Here, the maximum current occurs at the electrical angle of 300 degrees. FIG. 6 shows a motor phase current measurement result for a 150 electrical degrees rotated position from the rotor position illustrated in FIGS. 4A-4F. Here, the maximum current occurs at the electrical angle of 90 degrees.

The set of 6 evenly spaced points [y0, y1 . . . y5] representing current values in one electrical cycle at angles of 0, 60, 170, 180, 240, and 300 electrical degrees represent an arbitrary measure of current resulting from an impulse of voltage applied to the stator of the PM motor 30. The currents, as described above, are recorded at 60 degree stator intervals. This sampling represents an otherwise continuous curve that includes a maximum current value at some position within the cycle, and the maximum current identifies rotor alignment along the d-axis in a d-q coordinate system. The d-q coordinate system is a rotational orthogonal coordinate system having a d-axis and a q-axis which are rotated in sync with the rotation of the motor 30. The d-axis extends in the direction of magnetic flux produced by the rotor, and the q-axis extends in the direction of torque to be generated by the motor.

To identify the maximum current, a set of slopes [$s_0$, $s_1$, . . . $s_5$] is derived from the collected set of current magnitudes. The slope is calculated from the average slope of the adjacent points:

$$s_i = \frac{y_{i+1} - y_{i-1}}{120}.$$

The angle, magnitude and slope can then be gathered in a 6×3 information matrix [Q] that includes angle, magnitude and slope for each of the 6 points. Subsequent analysis is based on the information in the matrix, as described below.

Figure 7:
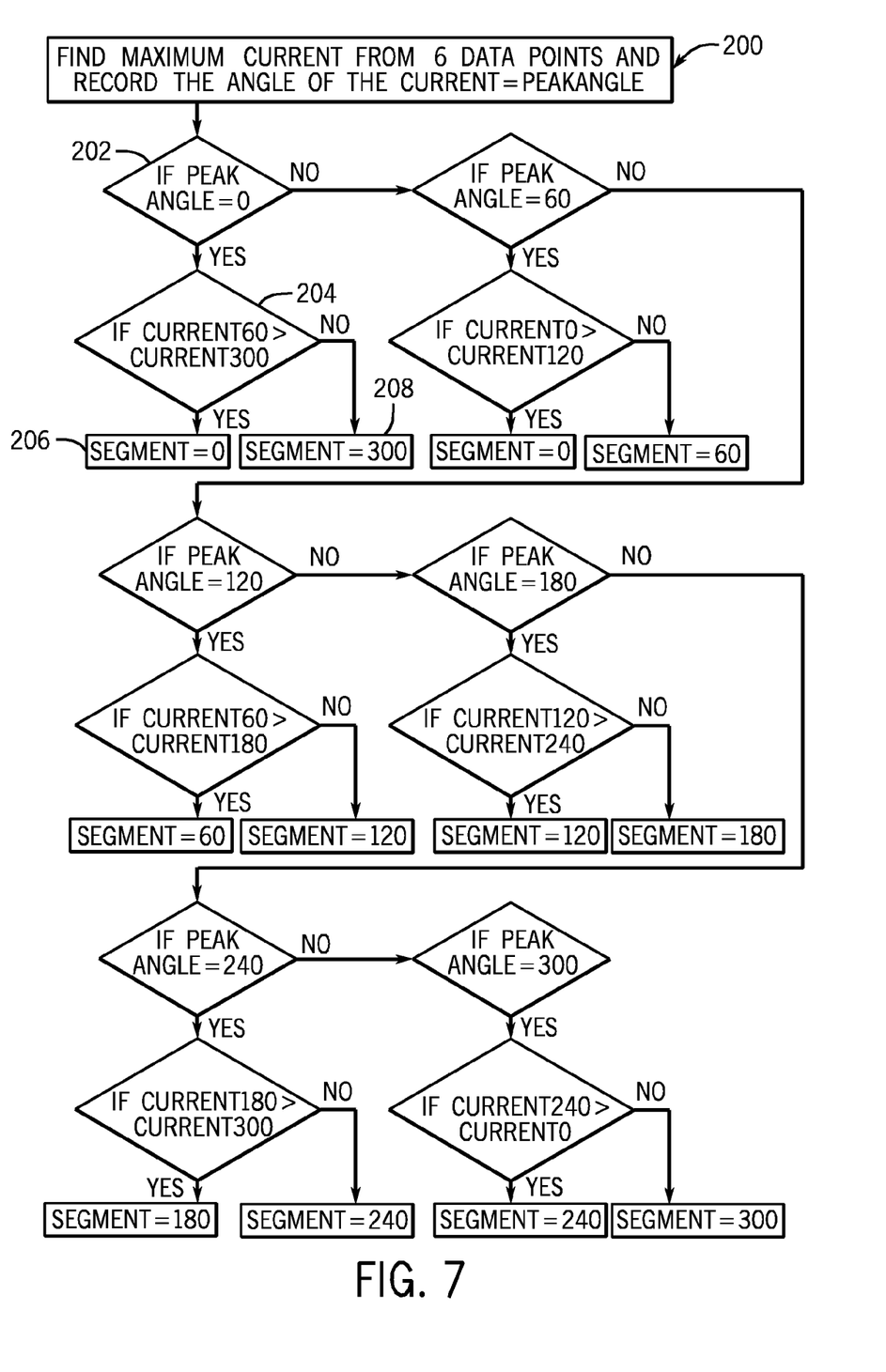
FIG. 7 is a flow chart identifying the electrical angle segment in which the peak current occurs.

Referring now to FIG. 7, two adjacent points are selected from the matrix to define an electrical angle segment that contains the maximum current value. FIG. 6 shows a flow chart for identifying the electrical angle segment. To determine the electrical angle segment including the maximum current, the controller evaluates the magnitude of the current at each of the electrical angles, and determine which of the electrical magnitudes is the highest (step 200). This angle is designated the peak angle. Once the peak angle is determined, an analysis is performed to determine whether the magnitude of the current is rising or falling between the two adjacent points. For example, as shown in FIG. 7, if the electrical angle at zero or three hundred and sixty degrees is identified as containing the peak angle, as shown in step 202, the controller compares the magnitude of the current at the two immediately adjacent points (step 204), here at electrical angle sixty and three hundred. If the magnitude of the current at the electrical angle sixty exceeds that at the electrical angle of three hundred, we know that the maximum current occurs in the segment between zero and sixty degrees, since we have already identified the maximum current to be at the point having an electrical angle of zero. This segment is designated as Segment Zero in step 206. Conversely, if the current at the electrical angle of sixty is less than the current at the electrical angle of three hundred, the maximum current appears in the electrical angle segment extending between zero and three hundred degrees. This segment is designated as Segment Three Hundred in step 208. The algorithm steps through the remaining points to identify the appropriate peak angle, as shown in FIG. 7. These steps are identical to the steps described above, and will not be discussed further.

A 7th order spline next evaluates the selected electrical angle segment to provide more detailed information. The spline requires 8 boundary values, 4 for the initial point of the electrical current segment, and another 4 for the final point of the electrical current segment. The information needed includes magnitude, slope, acceleration and jerk, as defined by the equations shown below. Acceleration and jerk are set to zero at each end and the magnitude and slope are derived from the information matrix [Q] described above.

A 7th order polynomial of current magnitude is defined by:

$$y = c1*u^7 + c2*u^6 + c3*u^5 + c4*u^4 + c5*u^3 + c6*u^2 + c7*u^1 + c8$$

And slope by a 6th order polynomial, which is a derivative of the current equation above:

$$s = \frac{1}{p}*(7*c1*u^6 + 6*c2*u^5 + 5*c3*u^4 + 4c4*u^3 + 3*c5*u^2 + 2*c6*u^1 + c7)$$

The acceleration is derived from the slope equation, and is defined by a $5^{th}$ order polynomial:

$$a = \frac{1}{p^2}*(42*c1*u^5 + 30*c2*u^4 + 20*c3*u^3 + 12*c4*u^2 + 6*c5*u^1 + 2*c6)$$

The jerk is derived from the acceleration and is defined by a $4^{th}$ order polynomial:

$$j = \frac{1}{p^3}*(210*c1*u^4 + 120*c2*u^3 + 60*c3*u^2 + 24*c4*u^1 + 6*c5)$$

The Independent variable u from the equations above is normalized in the range from 0 to 1, corresponding to 0 to 60 degrees. Polynomial evaluation is performed using the following matrix notation:

$$[y_0, y_1, s_0, s_1, 0, 0, 0, 0]^T = [A]*[c1, c2, c3, c4, c5, c6, c7, c8]^T$$

Where [A] is a transfer matrix and the subscripts 0, 1 represent the initial and final boundary points respectively. The matrix notation is a combination of the eight equations below.

$$y_0 = c8$$

$$y_1 = c1 + c2 + c3 + c4 + c5 + c6 + c7 + c8$$

$$s_0 = \frac{1}{p} * c7$$

$$s_1 = \frac{1}{p} * (7*c1 + 6*c2 + 5*c3 + 4*c4 + 3*c5 + 2*c6 + c7)$$

$$a_0 = 0 = \frac{1}{p^2} * 2 * c6$$

$$a_1 = 0$$
$$= \frac{1}{p^2} * (42*c1 + 30*c2 + 20*c3 + 12*c4 + 6*c5 + 2*c6)$$

$$j_0 = 0 = \frac{1}{p^3} * 6 * c5$$

$$j_1 = 0$$
$$= \frac{1}{p^3} * (210*c1 + 120*c2 + 60*c3 + 24*c4 + 6*c5)$$

And matrix A is defined as:

$$A = \begin{pmatrix} 0 & 0 & 0 & 0 & 0 & 0 & 0 & 1 \\ 1 & 1 & 1 & 1 & 1 & 1 & 1 & 1 \\ 0 & 0 & 0 & 0 & 0 & 0 & \frac{1}{p} & 0 \\ \frac{7}{p} & \frac{6}{p} & \frac{5}{p} & \frac{4}{p} & \frac{3}{p} & \frac{2}{p} & \frac{1}{p} & 0 \\ 0 & 0 & 0 & 0 & 0 & \frac{2}{p^2} & 0 & 0 \\ \frac{42}{p^2} & \frac{30}{p^2} & \frac{20}{p^2} & \frac{12}{p^2} & \frac{6}{p^2} & \frac{2}{p^2} & 0 & 0 \\ 0 & 0 & 0 & 0 & \frac{6}{p^3} & 0 & 0 & 0 \\ \frac{210}{p^3} & \frac{120}{p^3} & \frac{60}{p^3} & \frac{24}{p^3} & \frac{6}{p^3} & 0 & 0 & 0 \end{pmatrix}$$

Where p=60, the number of electrical degrees between subsequent points. The coefficients are found by taking the inverse matrix and solving:

$$[c1,c2,c3,c4,c5,c6,c7,c8]^T = [A]^{-1} * [y_0, y_1, s_0, s_1, 0, 0, 0, 0]^T$$

Once coefficients are found, the Horner method is used to solve:

$$y = u*(u*(u*(u*(u*(u*(c1*u+c2)+c3)+c4)+c5)+c6)+c7)+c8.$$

Here a position of maximum current is sought by methods of peak detection as "u" ranges from 0 to 1.

The following slope equation may also be used in an alternate approach to peak detection that identifies zero crossing:

$$y = u*(u*(u*(u*(u*(k1*u+k2)+k3)+k4)+k5)+k6)+k7.$$

The 7 "k" coefficients used to calculate slope are defined as follows:

$$k1 = 7/60 * c1$$

$$k2 = 6/60 * c2$$

$$k3 = 5/60 * c3$$

$$k4 = 4/60 * c4$$

$$k5 = 3/60 * c5$$

$$k6 = 2/60 * c6$$

$$k7 = 1/60 * c7$$

Figure 8:
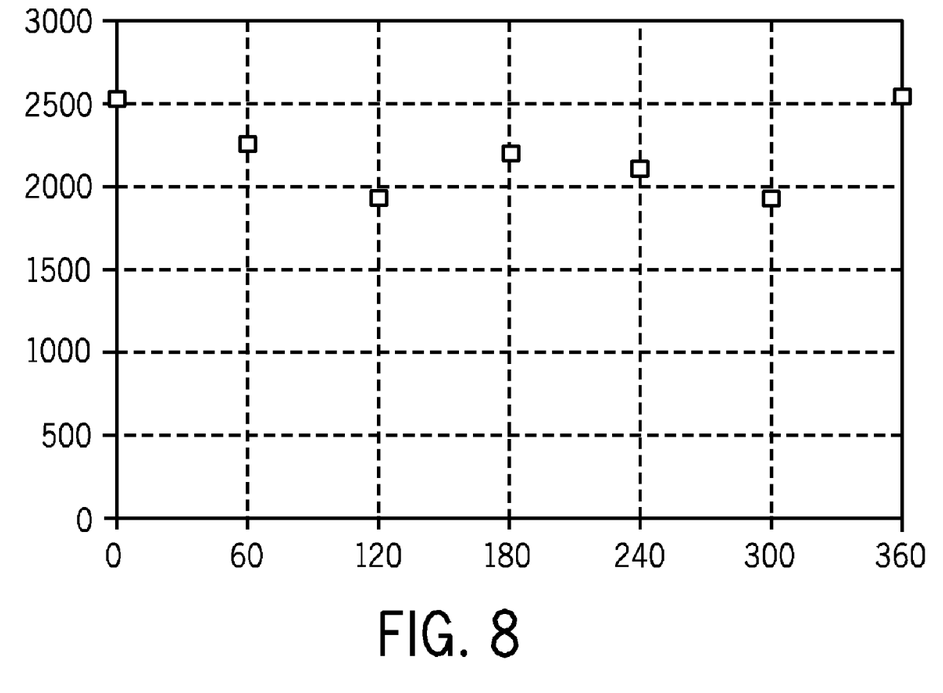
FIG. 8 is the original data of the measured maximum current for the information matrix of Table 1.
Figure 9:
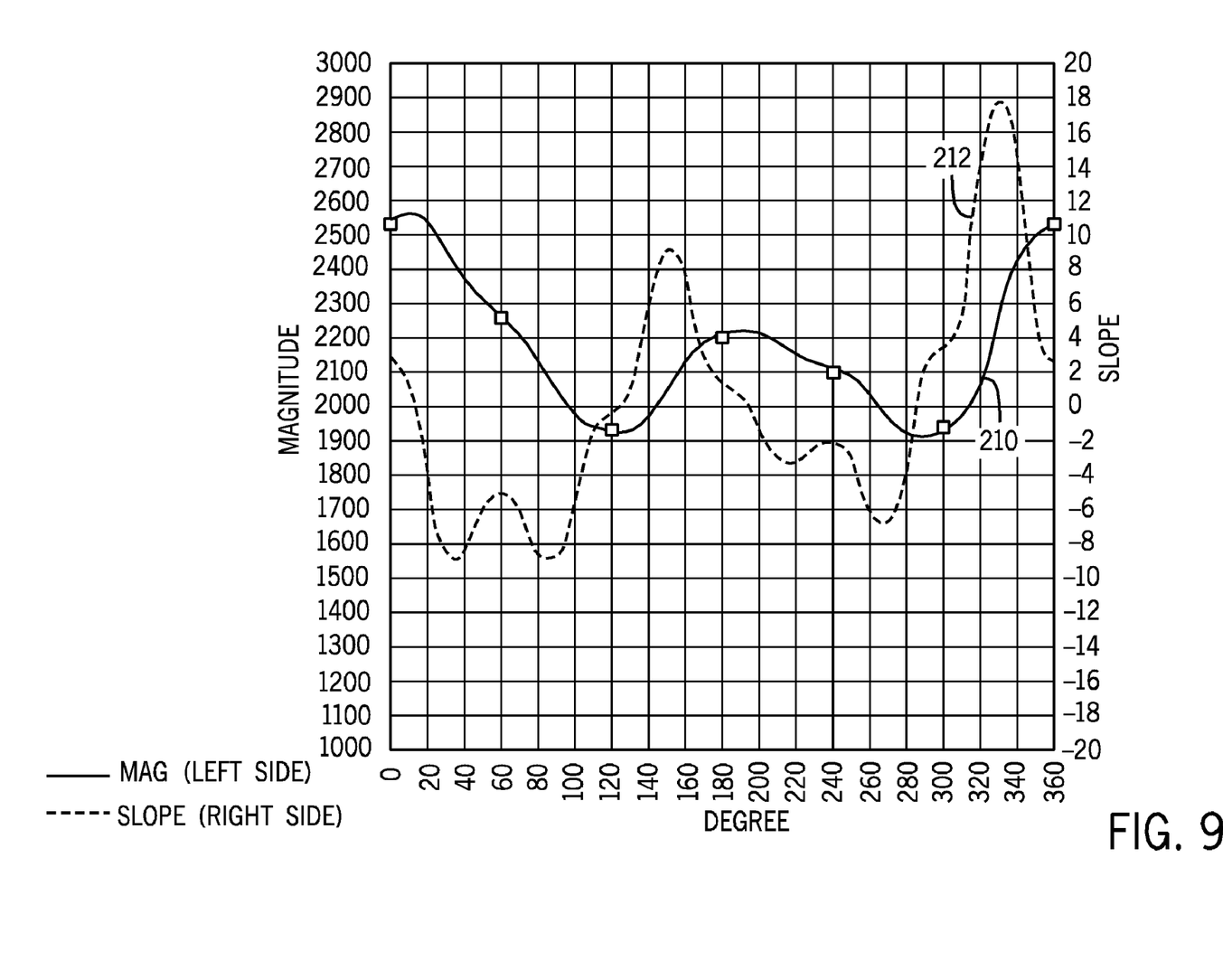
FIG. 9 is a graph illustrating 360° view.
Figure 10:
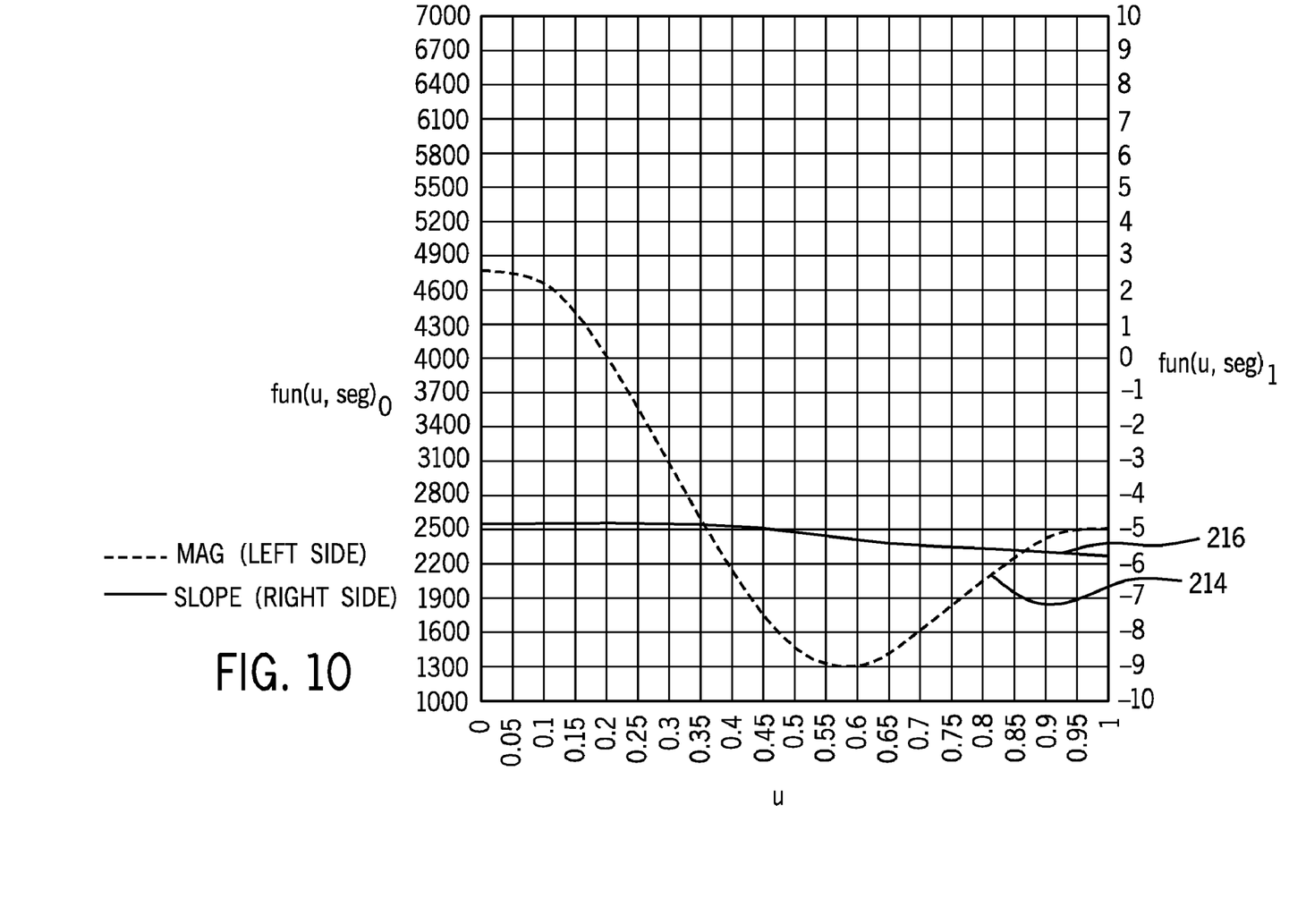
FIG. 10 is a graph illustrating segment 0 magnitude and slope.

Shown in the table reproduced below is a typical information matrix used in the example that follows, where the original data of the measured maximum current is plotted in FIG. 8, which illustrates current magnitude versus electrical angle at the stator, where the flux direction produced by the UP-VN volt-sec pulse is defined as zero degrees. For sake of visualization, FIG. 9 is a graph of a 7th order spline with all segments spliced end to end illustrating the magnitude 210 of the current and the slope 212 of the current for the electrical cycle. This graph is for illustration, as normally there is no need to develop this curve and the segment having peak magnitude is readily found from the [Q] matrix by other means, as described above. Notice that in segment 0 the current peaks in the interval between 0 and 20 degrees. FIG. 10 shows an expanded view of segment 0, detailing the slope 214 and magnitude 216. Here, the peak magnitude is broad and that slope curve provides a clearer indication of the peak at around 0.22*60=13.2 degrees where the slope crosses zero. Thus, to the best of our analysis, d-axis rotor is located at 13.2 degrees from the beginning of segment 0. Had this been segment 1 the rotor would be located at 13.2+60=73.2 degrees or segment 2 at 13.2+120=132.2 degrees etc. from the first stator point of reference.

angle/magnitude/slope $$Q = \begin{pmatrix} 0 & 2531 & 2.667 \\ 60 & 2261 & -4.983 \\ 120 & 1933 & -0.5 \\ 180 & 2201 & 10408 \\ 240 & 2102 & -2.167 \\ 300 & 1941 & 3.575 \end{pmatrix}$$

Verification of the Method

Figure 11:
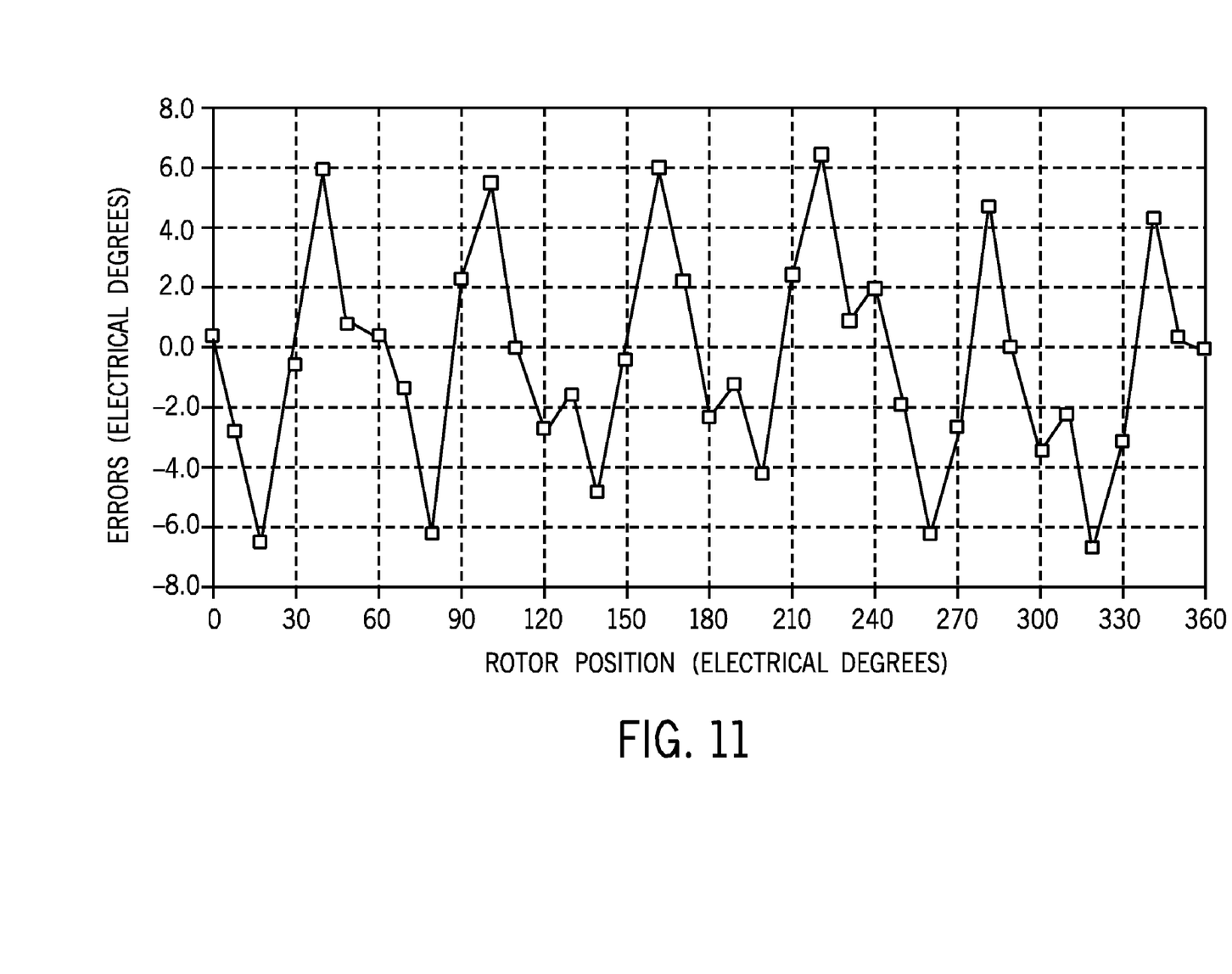
FIG. 11 is a graph illustrating rotor position estimation error with PF755 480V 22 A drive and a 8.7 KW 20.9 A PM motor.

The proposed method has experimentally been implemented in the PF755 drive commercially available through Rockwell Automation of Milwaukee, Wis., and tested with a PM motor. The drive ratings are 480V, 22 A and the PM motor is a 1326AB-B740C with ratings of 8.7 KW, 20.9 A, 1570 RPM for the test set up, also commercially available from Rockwell Automation of Milwaukee, Wis. FIG. 11 illustrates the rotor position estimation error data at every 10 electrical degrees for the entire electrical cycle of 360 electrical degrees, where the position angle errors are found within ±7 degrees.

Through experimentation with various permanent magnet motors the inventors have found that the worst case inaccuracy for a 7th order spline is than ±10 degrees; 5th order spline about ±15 degrees and cubic spline about ±20 degrees.

A preferred embodiment of the invention has been described in considerable detail. Many modifications and variations to the preferred embodiment described will be apparent to a person of ordinary skill in the art. Therefore, the invention should not be limited to the embodiment described. To apprise the public of the scope of this invention, the following claims are made:

What is claimed is:

1. A method for determining the absolute position of a rotor in a PMSM motor having a rotor which includes at least one north pole, at least one south pole, and a stator having windings arranged about a core, wherein each winding is arranged such that when a current passes through the winding, the current generates flux in the core, the method comprising the steps of:
- (a) applying a short duration voltage pulse of to the stator windings at each of a plurality of successively spaced electrical angle sample points;
- (b) sampling a current at the end of each voltage pulse;
- (c) identifying an electrical angle segment between a first and a second successive electrical angle sample point that includes a maximum current;
- (d) evaluating a magnitude of the current in the identified electrical angle segment to locate the peak current; and
- (e) determining an angle of the peak current, wherein the angle of the peak current correlates to a rotor position.

2. The method of claim 1, wherein step (c) further comprises the step of calculating a current slope between two adjacent electrical angle sample points.

3. The method of claim 2 wherein step (c) further comprises determining a magnitude of the current at successive electrical angle sample points, subtracting the magnitude of the current at one of the successive electrical angle sample points from the magnitude of the current at the other of the successive electrical angle sample points, and dividing by the difference in electrical angle between the successive electrical angle sample points to determine a slope.

4. The method of claim 1, wherein step (a) comprises spacing the electrical angle sample points at intervals through an electrical cycle.

5. The method of claim 1, wherein step (e) comprises performing a spline interpolation of the identified electrical angle segment.

6. The method of claim 4, further comprising the step of determining a magnitude, a slope, an acceleration and a jerk associated with the current at the first and second electrical angle in the electrical angle segment for use as boundary values in the spline interpolation.

7. The method of claim 1, wherein step (f) comprises evaluating a magnitude of the current at each of the electrical angle sample points, identifying the electrical angle sample point that has the greatest magnitude of current, and evaluating the slope of the current between the identified electrical angle sample point and the adjacent electrical angle sample points to determine a direction that the slope is rising.

8. The method of claim 1, wherein step (e) comprises evaluating a magnitude of the current and a slope of the current in the identified electrical angle segment to locate the peak current.

9. The method of claim 5, wherein the spline is a seventh order spline.

10. The method of claim 5, wherein step (d) comprises identifying a maximum sampled motor current from the sampled motor currents at the electrical angle sample points, and identifying a direction of the slope of the motor current at the electrical angle sample point containing the identified maximum sampled motor current.

11. The method of claim 10, wherein step (d) comprises interpolating between the electrical angle sample point having the maximum motor current and the adjacent electrical angle sample point in the direction of rising slope to identify the maximum current value in the electrical cycle.

12. The method of claim 10, wherein step (d) comprises applying a spline function of current magnitude between the electrical angle sample point having the maximum motor current and the adjacent electrical angle sample point in the direction of rising slope.

13. A drive system comprising:
- a PMSM motor having a rotor which includes at least one north pole, at least one south pole, and a stator having windings arranged about a core, wherein each winding is arranged such that when a current passes through the winding, the current generates flux in the core;
- an inverter including switching devices connected to corresponding windings to apply voltage pulses to the windings;
- a current sensor associated with each of the windings; and
- a controller connected to the inverter and the current sensor for controlling voltage pulses to the windings and sampling current, the controller being programmed to:
  - (a) activate the switching devices to apply a short duration voltage pulse of to the stator windings at each of a plurality of successively spaced electrical angle sample points;
  - (b) sample a current at the end of each voltage pulse at the current sensor;
  - (c) identify an electrical angle segment between a first and a second successive electrical angle sample point that includes a maximum current;
  - (d) evaluate a magnitude of the current in the identified electrical angle segment to locate the peak current; and
  - (e) determine an angle of the peak current, wherein the angle of the peak current correlates to a rotor position.

14. The drive system of claim 13, wherein the controller is further programmed in step (c) to calculate a current slope between two adjacent electrical angle sample points.

15. The drive system of claim 14 wherein the controller is further programmed in step (c) to determine a magnitude of the current at successive electrical angle sample points, subtract the magnitude of the current at one of the successive electrical angle sample points from the magnitude of the current at the other of the successive electrical angle sample points, and divide by the difference in electrical angle between the successive electrical angle sample points.

16. The drive system of claim 13, wherein the controller is further programmed in step (a) to space the electrical angle sample points at intervals through an electrical cycle.

17. The drive system of claim 13, wherein the controller is further programmed in step (e) to perform a spline interpolation of the identified electrical angle segment.

18. The drive system of claim 17, wherein the controller is further programmed to determine a magnitude, a slope, an acceleration and a jerk associated with the current at the first and second electrical angle in the electrical angle segment for use as boundary values in the spline interpolation.

19. The drive system of claim 13, wherein the controller is further programmed in step (f) to evaluate a magnitude of the current at each of the electrical angle sample points, identify the electrical angle sample point that has the greatest magnitude of current, and evaluate the slope of the current between the identified electrical angle sample point and the adjacent electrical angle sample points to determine a direction that the slope is rising.

20. The drive system of claim 13, wherein the controller is further programmed in step (e) to evaluate a magnitude of the current and a slope of the current in the identified electrical angle segment to locate the peak current.

21. The drive system of claim 18, wherein the spline is a seventh order spline.

22. The drive system of claim 18, wherein the controller is further programmed in step (d) to identify a maximum sampled motor current from the sampled motor currents at the electrical angle sample points, and identify a direction of the slope of the motor current at the electrical angle sample point containing the identified maximum sampled motor current.

23. The drive system of claim method of claim 22, wherein the controller is further programmed in step (d) to interpolate between the electrical angle sample point having the maximum motor current and the adjacent electrical angle sample point in the direction of rising slope to identify the maximum current value in the electrical cycle.

24. The drive system of claim 23, wherein the controller is further programmed at step (d) to apply a spline function of current magnitude between the electrical angle sample point having the maximum motor current and the adjacent electrical angle sample point in the direction of rising slope.

* * * * *